United States Patent Office 3,213,521
Patented Oct. 26, 1965

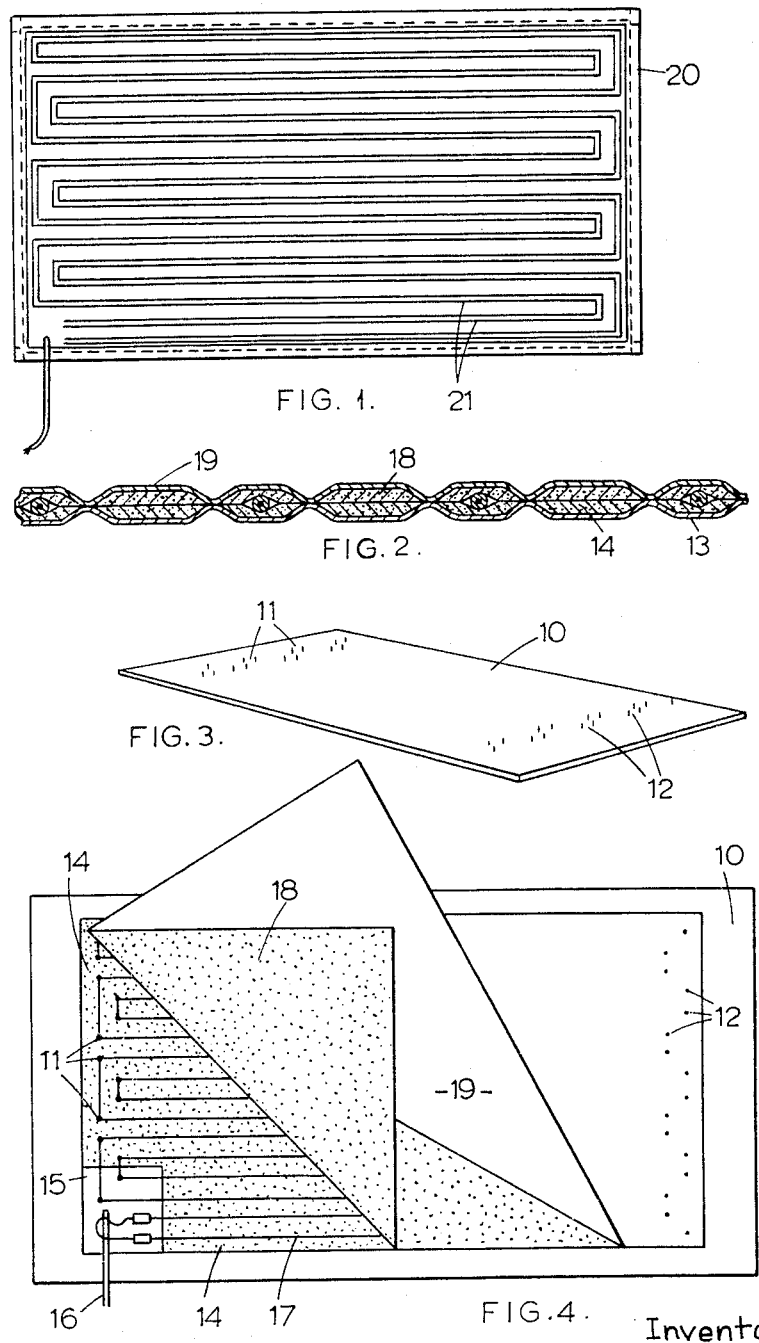

3,213,521
METHOD OF MAKING AN ELECTRIC BLANKET
Leonard C. Owers, Colbury, near Totton, England, assignor to Frederick Williams (Appliances) Limited, Southampton, England, a British company
Original application June 15, 1961, Ser. No. 117,388, now Patent No. 3,102,186, dated Aug. 27, 1963. Divided and this application Aug. 23, 1962, Ser. No. 219,069
Claims priority, application Great Britain, July 8, 1960, 23,935/60
4 Claims. (Cl. 29—155.63)

This invention relates to electric blankets and more particularly to a method of making such blankets.

In my co-pending patent application Serial No. 117,388, filed June 15, 1961 and now Patent No. 3,102,186, issued August 27, 1963 of which the present application is a division, I have described and claimed an electrically heated blanket comprising two inner layers of synthetic plastics material, a heating element consisting of conductor wires laid in reversing lines spaced in substantially parallel relationship, and interposed between said two layers of material and two outer layers of fabric covering respectively the outer surfaces of said inner layers, said inner layers being bonded together and to the fibres of the outer fabric covering layers by welding along lines disposed between the lines of the conducting wire.

The object of the present invention is to provide a method which permits the rapid assembly of the various layers of the blanket and the subsequent completion of the manufacture.

The method according to the invention is illustrated in the accompanying drawings, in which FIG. 1 is a plan view of a finished blanket made in accordance with the invention.

FIG. 2 is an enlarged cross section taken on the line II—II, FIG. 1.

FIG. 3 illustrates a jig on which the various layers of the blanket may be assembled during the course of manufacture, and FIG. 4 illustrates the assembly of the various layers of the blanket prior to the welding operation.

Referring first to FIG. 3 this figure shows a jig comprising a rectangular aluminum plate 10 having a thickness of approximately 9/16" and having adjacent each end a plurality of steel pointed pins 11, 12.

The various layers of the blanket and the heating element are assembled on this jig in the following sequence. An outer or covering layer 13 of fabric is first placed on the jig with the pins 11, 12 passing through the layer, and a layer 14 of polyvinyl chloride wadding or foam is then similarly placed on the covering material 13 with the pins 11, 12 passing through this layer 14. A canvas square 15 holding the mains lead 16 is placed in position and conducting wire 17 is then wound around the pins 11, 12 to form the heating element which is connected to the mains lead 16. A second layer 18 of polyvinyl chloride wadding or foam and a second outer or covering layer 19 of fabric are then successively placed on the exposed side of the heating element 17, the whole assembly being held in place on the aluminum plate by the pins 11, 12. When the assembly has thus been completed the various layers of the assembly are welded or fused together by means of a high frequency electronic or other suitable welding machine, along a plurality of "quilting" lines 21.

This welding operation produces fusion of the two thermoplastic layers along the weld lines and causes the layers to be bonded together and to the fibres of the outer covering layers whereby all the layers of the assembly are joined together along the weld lines.

The quilting lines 21 are disposed between the runs of the wire 17 in such a way that the wire 17 is positively positioned.

A satin binding tape 20 may be sewn around the edges of the assembly, if required.

The fabric covering material 13, 19 in the above embodiment may be cotton, cotton/rayon mixture or wool mixture.

As will be apparent from the foregoing description the method according to the invention permits of rapidly assembling the various layers of the blanket with the heating element laid and correctly positioned between the inner layers, the manufacture being thereafter completed by a simple welding operation.

What I claim and desire to secure by Letters Patent is:

1. The method of assembling the layers of an electric blanket on a jig comprising a plate having adjacent each end a series of spaced pins, consisting in successively assembling on said jig a first outer layer of fabric and a first inner layer of synthetic heat weldable thermoplastic foam, with said pins passing through said layers, winding in reversing lines around and between said pins an electrically conducting wire to form spaced parallel heating elements extending lengthwise across said first inner layer, successively assembling on said jig a second inner layer of synthetic heat weldable thermoplastic foam and a second outer layer of fabric with said pins passing through said layers, and connecting said inner layers together and to said outer layers along spaced lines between said heating elements by weld lines which serve to maintain said heating elements in correct spaced relationship, the said outer layers being joined together and to the said inner layers along said weld lines by fusion of the said inner layers produced when welded.

2. The method of assembling the layers of an electric blanket on a jig comprising a plate having adjacent each end a series of spaced pins, consisting in successively assembling on said jig a first outer layer of fabric and a first inner layer of synthetic heat weldable thermoplastic wadding with said pins passing through said layers, winding in reversing lines around and between said pins an electrically conducting wire to form spaced parallel heating elements extending lengthwise across said first inner layer, successively assembling on said jig a second inner layer of synthetic heat weldable thermoplastic wadding and a second outer layer of fabric with said pins passing through said layers, and connecting said inner layers together and to said outer layers along spaced lines between said heating elements by weld lines which serve to maintain said heating elements in correct spaced relationship, the said outer layers being joined together and to the said inner layers along said weld lines by fusion of the said inner layers produced when welding.

3. The method of assembling the layers of an electric blanket on a jig comprising a plate having adjacent each end a series of spaced pins consisting in successively assembling on said jig a first outer layer of fabric and an inner layer of synthetic heat weldable thermoplastic foam, with said pins passing through said layers, winding in reversing lines around and between said pins an electrically conducting wire to form spaced parallel heating elements extending lengthwise across said foam inner layer, successively assembling on said jig an inner layer of synthetic heat weldable thermoplastic wadding and a second outer layer of fabric with said pins passing through said layers, and connecting said inner layers together and to said outer layers along spaced lines between said heating elements by weld lines which serve to maintain said heating elements in correct spaced relationship, the said outer layers being joined together and to the said inner layers along said weld lines by fusion of the said inner layers produced when welding.

4. The method of assembling the layers of an electric blanket on a jig comprising a plate having adjacent each end a series of spaced pins consisting in successively assembling on said jig a first outer layer of fabric and an inner layer of synthetic heat weldable thermoplastic wadding with said pins passing through said layers, winding in reversing lines around and between said pins an electrically conducting wire to form spaced parallel heating elements extending lengthwise across said wadding inner layer, successively assembling on said jig an inner layer of synthetic heat weldable thermoplastic foam and a second layer of fabric with said pins passing through said layers, and connecting said inner layers together and to said outer layers along spaced lines between said heating elements by weld lines which serve to maintain said heating elements in correct spaced relationship, the said outer layers being joined together and to the said inner layers along said weld lines by fusion of the said inner layers produced when welding.

References Cited by the Examiner

UNITED STATES PATENTS

| | | | |
|---|---|---|---|
| 2,126,833 | 8/38 | Steinberger | 219—46 |
| 2,548,468 | 4/51 | Crise | 219—46 |
| 2,548,592 | 4/51 | De Michele | 29—155.68 |
| 2,631,219 | 3/53 | Suchy | 219—46 |
| 2,708,234 | 5/55 | Kerr | 219—46 |
| 2,853,764 | 9/58 | De Michele | 29—155.62 |
| 3,064,221 | 11/62 | King | 29—155.68 |

WHITMORE A. WILTZ, *Primary Examiner.*

JOHN F. CAMPBELL, *Examiner.*

UNITED STATES PATENT OFFICE
CERTIFICATE OF CORRECTION

Patent No. 3,213,521                          October 26, 1965

Leonard C. Owers

It is hereby certified that error appears in the above numbered patent requiring correction and that the said Letters Patent should read as corrected below.

In the grant, lines 2 and 3, for "assignor to Frederick Williams (Appliances) Limited, of Southampton, England, a British company" read -- assignor to Dreamland Electrical Appliances Limited, of Southampton, England, a British company --; line 12, for "Frederick Williams (Appliances) Limited, its successors" read -- Dreamland Electrical Appliances Limited, its successors --; in the heading to the printed specification, lines 3 to 5, for "assignor to Frederick Williams (Appliances) Limited, Southampton, England, a British company" read -- assignor to Dreamland Electrical Appliances Limited, Southampton, England, a British company --.

Signed and sealed this 11th day of October 1966.

(SEAL)
Attest:

ERNEST W. SWIDER                              EDWARD J. BRENNER
Attesting Officer                             Commissioner of Patents